United States Patent [19]

La Force

[11] Patent Number: 5,189,798
[45] Date of Patent: Mar. 2, 1993

[54] ALIGNMENT GAUGE

[76] Inventor: Jeffrey La Force, P.O. Box 3636, Napa, Calif. 94558

[21] Appl. No.: 788,504

[22] Filed: Nov. 6, 1991

[51] Int. Cl.⁵ .................... G01D 21/00; G01B 5/25
[52] U.S. Cl. ................................ 33/1 Q; 33/412; 33/651; 33/533
[58] Field of Search ............... 33/1 Q, 338, 412, 833, 33/501.07, 501.2, 521, 645, 651, 651.4, 546, 552, 533

[56] References Cited

U.S. PATENT DOCUMENTS

| | | | |
|---|---|---|---|
| 1,237,748 | 8/1917 | Cash | 33/338 |
| 1,329,197 | 1/1920 | Matoba | 33/338 |
| 2,231,432 | 2/1941 | Wilczek | 33/521 |
| 2,304,313 | 12/1942 | Misz | 33/338 |
| 3,911,586 | 10/1975 | Malonda | 33/533 |
| 4,288,926 | 9/1981 | Long et al. | 33/1 Q |
| 4,428,126 | 1/1984 | Banks | 33/412 |
| 4,578,869 | 4/1984 | O'Brien | 33/533 |
| 4,693,012 | 9/1987 | Cesna | 33/533 |
| 4,879,819 | 11/1989 | Johnston et al. | 33/833 |
| 5,048,195 | 9/1991 | Leonov | 33/533 |

*Primary Examiner*—Thomas B. Will
*Attorney, Agent, or Firm*—Richard C. Litman

[57] ABSTRACT

An alignment gauge to facilitate the measurement of welded joints and the alignment of elongated structures including beams, pipes, rails, such as train rails and trolley car rails. The alignment gauge has five basic components, a base, an upright member and three dial indicators. The dial indicators are fastened along the top of the base, one at the center and one to each side of the center equally spaced from the center. The dial indicators have actuating plungers which pass through openings in the base and protrude through the bottom of the base. The upright member is mounted to the top of the base. It protects the dial indicators. The bottom of the base is placed on a calibration standard and dial indicators are adjusted to zero by a zero adjustment. With the dial indicators adjusted to zero, the alignment gauge is placed on the elongated structure with its center over the welded joint. The base has a channel in the center of the bottom surface that provides clearance for the welded joint. The center gauge provides a reading depicting the deviation in the welded joint and outside gauges display deviations of the joined elongated structures.

4 Claims, 4 Drawing Sheets

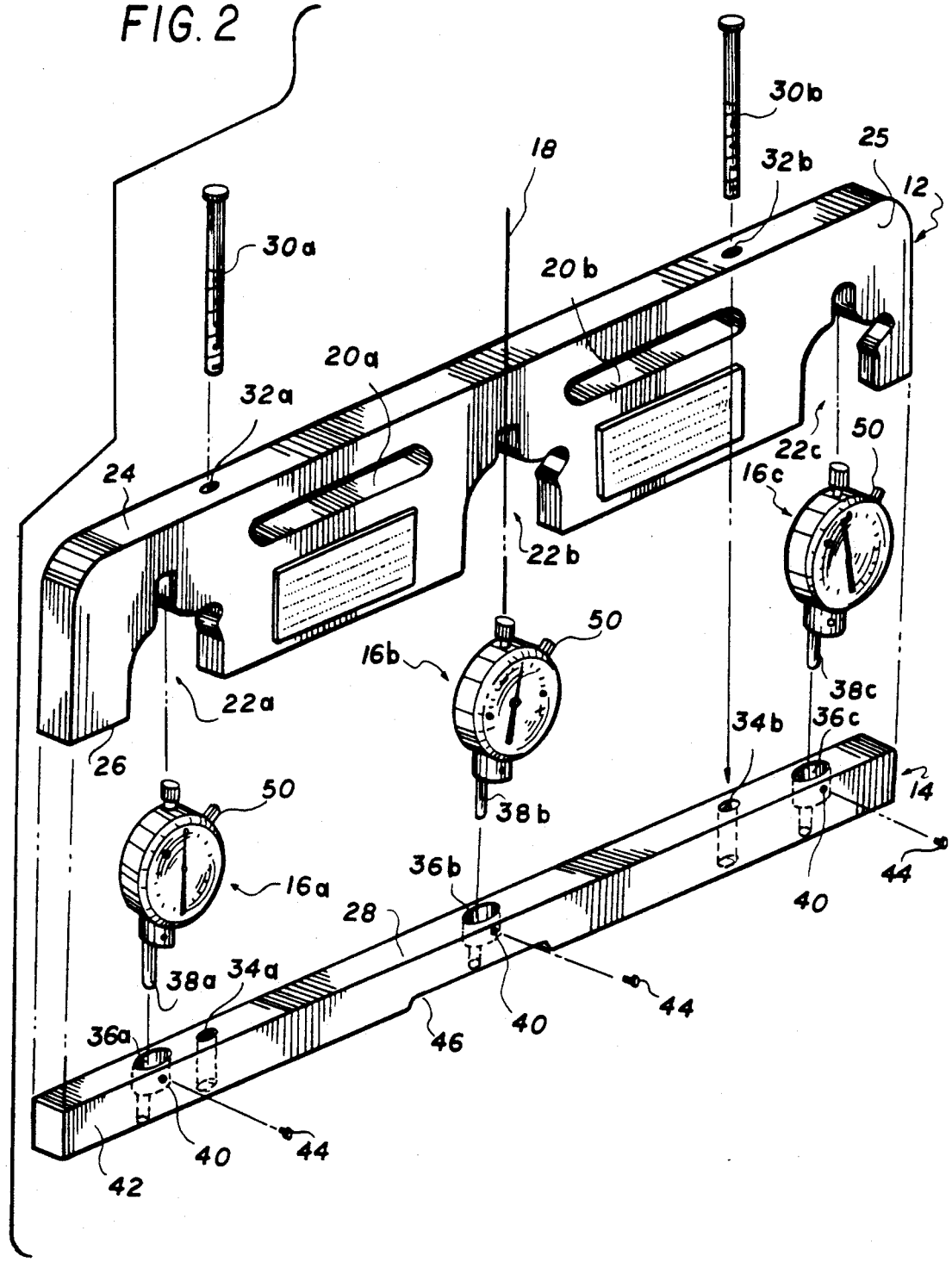

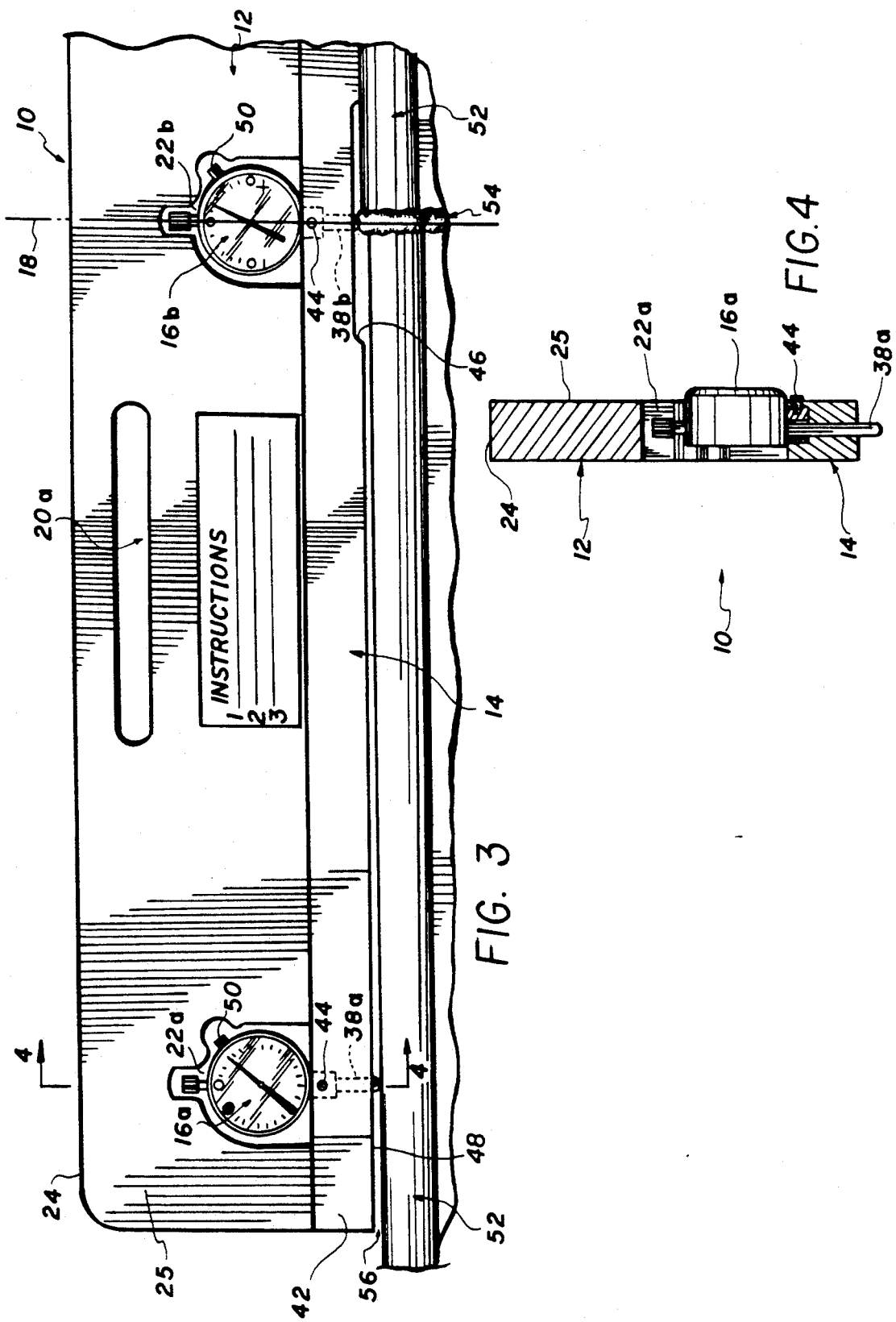

(PRIOR ART)

ALIGNMENT GAUGE

BACKGROUND OF THE INVENTION

1. Field of the Invention

The present invention relates to a alignment gauge used for measuring the alignment of beams, pipes, and the like and the welded joints thereof and more particularly, for measuring the alignment of rails, such as train rails or trolley car rails.

2. Description of Prior Art

The smooth and safe operation of vehicles which ride on rails is dependent on the accuracy in which the rails are assembled. Deviations in the welded joints and the rail alignment adjacent to the joints could produce hazardous operating conditions and effect the smoothness of the operation. Undue shock absorbed by the equipment causes premature wear on parts thereby increasing the cost of maintenance and decreasing the life of the vehicle. By minimizing the deviations in welded joints and the alignment of the rails, maintenance costs could be curtailed and the life of the vehicle could be prolonged. Currently, the method of measuring the alignment of a rail is accomplished by using a standard straight edge and a graduated taper gauge. U.S. Pat. No. 1,093,867 to LEGARE (issued Apr. 21, 1914) is an adjustable crown template which serves as a guide to establish the crown of a roadway. This template is comprised of a level straight edge and numerous gauges spaced equally apart. This straight edge extends across the width of a roadway. The gauges are employed to mark the crown desired prior to paving. U.S. Pat. No. 2,083,841 to HALL (issued Nov. 16, 1935) is another apparatus comprising a straight edge and a set of scales. This device also extends across the width of the road resting on road forms, such as the curb, on both sides.

SUMMARY OF THE INVENTION

By the present invention, an alignment gauge facilitating the measurement of the alignment of beams, pipes, rails (i.e. train rails or trolley car rails), and the like and welded joints thereof is disclosed.

The alignment device includes a straight edge base with a series of dial indicators mounted along the top. The dial indicators have actuating plungers which extend downward through openings in the base and protrude through the bottom. There is an upright surface attached to the top of the base to protect the dial indictors. This device provides the user with a clear, concise reading on the face of the dial indicator opposed to having to read gradient marks on rules and gauges.

Accordingly, one object of the present invention is to provide an alignment gauge to facilitate the measurement of welded joints and the alignment of the beams, pipes, rails, and the like in a more time effective manner and with greater precision.

Another object of the present invention is to provide an alignment gauge which would measure the alignment of the beams, pipes, rails and the like in a more accurate and timely manner.

It is a further object of the present invention is to provide a single compact alignment gauge of unitary construction for the measurement of welded joints and the alignment of beams, pipes, rails and the like.

With these and other objects in view which will more readily appear as the nature of the invention is better understood, the invention consists of the novel construction, combination and assembly of parts hereinafter more fully described, illustrated and claimed with reference being made to the attached drawings.

BRIEF DESCRIPTION OF THE DRAWINGS

FIG. 2 is an exploded perspective view showing the alignment gauge of the present invention.

FIG. 3 is a side elevational view showing the alignment gauge of the present invention.

FIG. 4 is a cross-sectional view of the alignment gauge of the present invention taken along the line 4—4 in FIG. 3.

Similar reference characters denote corresponding features consistently throughout the attached drawings.

DETAILED DESCRIPTION OF THE PREFERRED EMBODIMENT

Figure 5A:
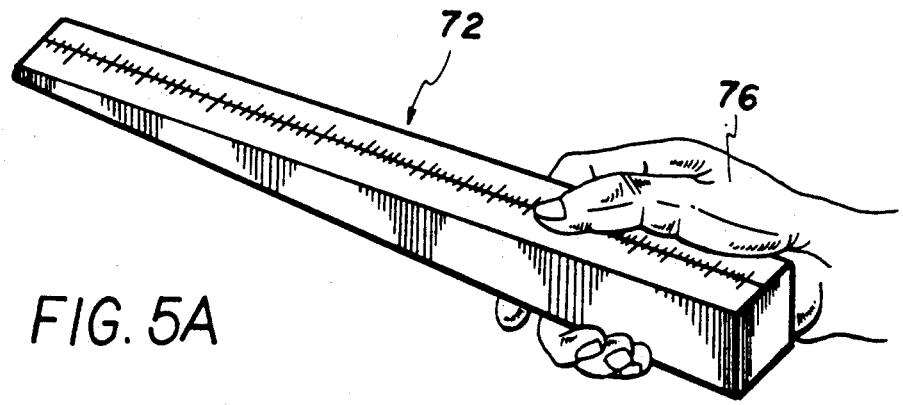
FIG. 5a is perspective view of the taper gauge of the prior art.
Figure 5B:
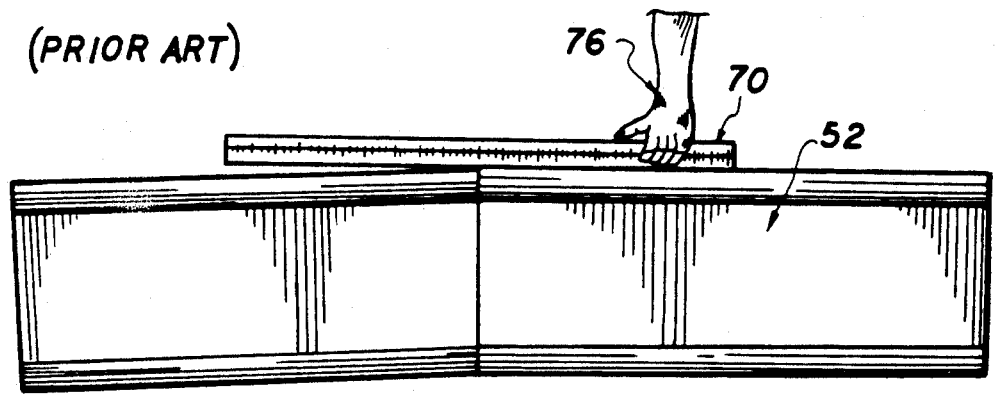
FIG. 5b is an environmental view of the prior art.
Figure 5C:
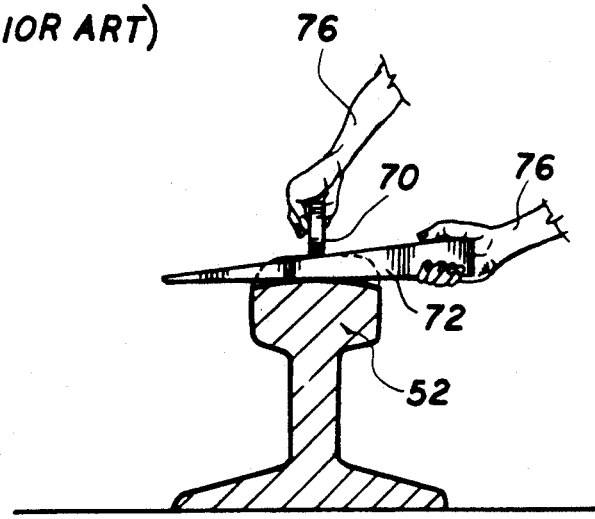
FIG. 5c is a side environmental view of the prior art.

Now, referring to the drawing, more particularly, FIG. 5a, FIG. 5b, and FIG. 5c, the current method in measuring the alignment of rails is by use of a straight edge 70 and a taper gauge 72. The straight edge 70 is placed longitudinally along the rail 52. The misalignment 74 of the rails 52 is measures by inserting a taper gauge 72 between the top surface of the rail 52 and the bottom of the straight edge 70. The user 76 takes a reading off of the taper gauge 72 where the face of the straight edge 70 meets a gradient mark on the taper gauge 72.

Figure 1:
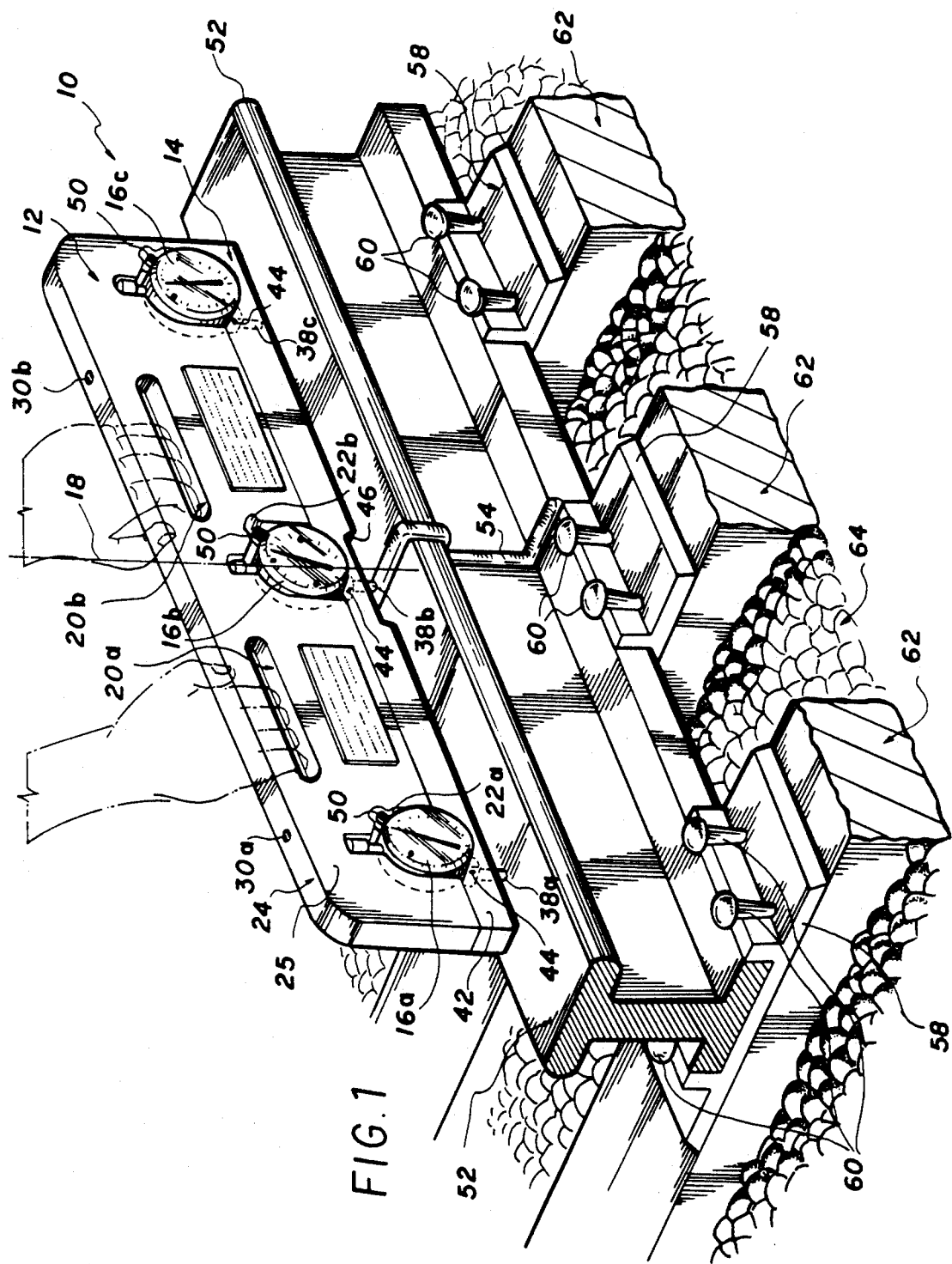
FIG. 1 is an environmental perspective view showing the alignment gauge of the present invention.

Referring to FIG. 1 and FIG. 2, the alignment gauge 10 of the present invention is comprised of five basic components, an upright member 12, a base 14, and three dial indicators 16a, 16b and 16c.

The upright member 12 is a milled piece of hardwood, elongated and substantially rectangular in shape. This upright member 12, having a center line 18, has two elongated longitudinal holes which serve as handles 20a and 20b; one handle 20a is located to the left of the center line 18 and one handle 20b is located to the right. These handles 20a and 20b are located adjacent the top surface 24 of the upright member 12. The upright member 12 includes an aperture 22a, 22b, and 22c (as shown in FIG. 2) for each dial indicator 16a, 16b, and 16c be recess mounted. One aperture 22a is located to the left of the center line 18, one aperture 22c is located to the right of the center line 18, and one aperture 22b is located along the center line 18. These apertures 22a, 22b, and 22c are located on the face 25 of the upright member 12 near the bottom surface 26.

Further referring to FIG. 2, the bottom surface 26 of the upright member 12 is mounted on the top surface 28 of the base 14. This mounting is accomplished by inserting two bolts 30a and 30b adjacent to the top surface 24 of the upright member 12 into two countersunk holes 32a and 32b which are drilled vertically through the upright member 12. One hole 32a is located to the left of the center line 18 and the other hole 32b is located to the right of the center line 18. These holes 32a and 32b alignment with two threaded holes 34a and 34b and are disposed along the top surface 28 of the base 14. The threads of the bolts 30a and 30b mate with the threaded holes 34a and 34b.

The base 14 is precision milled of rigid metal stock, preferably of aluminum because of it is characteristic of being lightweight and durable. The base 14, also having a center line 18, has three vertical holes 36a, 36b and 36c one for the passage of each one of the dial indicator plungers 38a, 38b, and 38c. These vertical holes 36a, 36b, and 36c are in locations corresponding to the three apertures 22a, 22b, and 22c. There are three holes 40 in the face 42 of the base 14 to permit the passage of the fastening screws 44 which secure the dial indicators 16a, 16b, and 16c to the base 14. An elongated channel 46 is centered along the line 18. This channel 46 extends 1.5 inches to both sides of the center line 18 and is machined 0.100 inches deep.

The dial indicators 16a and 16c to be mounted to the left and the right of the center line 18 read from 0.000 to 0.100 inches. The center dial indicator 16b reads from −0.05 to +0.05 inches. The dial indicators 16a, 16b and 16c each have a zero adjust 50. The plungers 38 of the dial indicators 16a, 16b, and 16c are inserted through the holes 36a, 36b, and 36c provided in the base 14. The dial indicators 16a, 16b and 16c are then fastened to base 14 with the fastening screws 44. When fastened in place, the dial indicators 16a, 16b and 16c are recessed into the apertures 22a, 22c, and 22b, respectively, and the plungers 38a, 38b and 38c protrude through the bottom of the base 14 (as shown in FIG. 4).

The alignment gauge 10 is simple to use. Referring to FIG. 1 and FIG. 3 shows a section of track comprising a rail 52 resting on a plurality of plates 58, each plate 58 is fastened to by a set of spikes 60 to a tie 62 in a gravel bed 64. With the alignment gauge placed longitudinally on a calibrated standard (not shown), adjust all three dial indicators 16a, 16b, 16c to zero by tuning the zero adjust 50. With the alignment gauge 10 adjusted to zero, place the alignment gauge 10 to a location on the rail 52 where the center line 18 lines up with a weld joint 54. With the alignment gauge 12 pressed firmly against the rail 52, the three dial indicators 16a, 16b and 16c will deflect to indicate a deviation in the welded joint 54 and the alignment of the rail 52. As shown, the left dial indicator 16a is measuring some vertical displacement 56 in the rail 52 to the left side of the welded joint 54. The center dial indicator 16b is measuring a rise in the welded joint 54 by displaying a positive reading. In this same manner, the user can also measure horizontal offset, crown camber, kink camber and finished tolerances.

It is to be understood that the present invention is not limited to the sole embodiment described above, but encompasses any and all embodiments within the scope of the following claims.

I claim:

1. An alignment gauge to facilitate the measurement of welded joints and the alignment of elongated structures, said alignment gauge comprising:
   a base having a top surface, a bottom surface, a center, a right side of said center, a left side of said center, a channel positioned within said bottom surface of said base at said center of said base, and a plurality of vertical holes through the base,
   at least three dial indicators, each including actuating plungers, each actuating plunger to be received by one of said vertical holes such that said actuating plungers each protrude through said bottom surface of said base, one of said dial indicators being positioned at said center of said base, one of said dial indicators being positioned at said left side of said center of said base, and one of said dial indicators being positioned at said right side of said center of said base,
   an upright member having a face and bottom surface, including an aperture for each said dial indicator, whereby said apertures are located on said face adjacent said bottom surface of said upright member, each said aperture location corresponds to each said dial indicator location on said base, said dial indicators are recessed in said apertures,
   fastening means to attach said upright member to said base, said bottom surface of said upright member fastened to said top surface of said base having the center of said upright member in common with said center of said base, and
   fastening means to secure said dial indicators to said top surface of said base.

2. The alignment gauge according to claim 1, wherein said dial indicators include a zero adjustment, whereby said zero adjustment calibrates said dial indicators to zero.

3. An alignment gauge to facilitate the measurement of deviations in welded joints and the alignment of rails, said alignment gauge comprising:
   a base having a top surface, a bottom surface, a center, a right side of said center, a left side of said center, a channel positioned within said bottom surface of said base at said center of said base, and a plurality of vertical holes through said base,
   at least three dial indicators, each having a dial indicator and each to be received by one of said vertical holes such that each said actuating plunger protrudes through said bottom surface of said base, one of said dial indicators being positioned at said center of said base, one of said dial indicators being positioned at said left side of said center of said base, and one of said dial indicators being positioned at said right side of said center of said base,
   an upright member having a face, bottom surface, and an aperture for each said dial indicator, whereby said apertures are located on said face adjacent said bottom surface of said upright member, each said aperture location corresponds to each said dial indicator location on said base, said dial indicators are recessed in said apertures,
   fastening means to attach said upright member to said base, said bottom surface of said upright member fastened to said top surface of said base having the center of said upright member in common with said center of said base, and
   fastening means to secure said dial indicators to said top surface of said base.

4. The alignment gauge according to claim 3, wherein said dial indicators include a zero adjustment, whereby said zero adjustment calibrates said dial indicators to zero.

* * * * *